(12) United States Patent
Hampapur et al.

(10) Patent No.: US 8,165,348 B2
(45) Date of Patent: Apr. 24, 2012

(54) DETECTING OBJECTS CROSSING A VIRTUAL BOUNDARY LINE

(75) Inventors: Arun Hampapur, Norwalk, CT (US); Ying-li Tian, Yorktown Heights, NY (US); Yun Zhai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 12/272,014

(22) Filed: Nov. 17, 2008

(65) Prior Publication Data

US 2010/0124356 A1    May 20, 2010

(51) Int. Cl.
 *G06K 9/00*    (2006.01)
(52) U.S. Cl. .......................... 382/103; 382/107; 348/169
(58) Field of Classification Search .................. 382/103, 382/107; 348/169
See application file for complete search history.

(56) References Cited

U.S. PATENT DOCUMENTS

| | | | |
|---|---|---|---|
| 6,696,945 B1 | 2/2004 | Venetianer et al. | |
| 6,970,083 B2 | 11/2005 | Venetianer et al. | |
| 7,088,846 B2 | 8/2006 | Han et al. | |
| 7,457,436 B2 * | 11/2008 | Paragios et al. | 382/103 |
| 7,526,102 B2 * | 4/2009 | Ozer | 382/103 |
| 2006/0067456 A1 * | 3/2006 | Ku et al. | 377/6 |
| 2007/0127774 A1 | 6/2007 | Zhang et al. | |
| 2008/0232688 A1 | 9/2008 | Senior et al. | |

OTHER PUBLICATIONS

Anup Doshi, "People Counting and Tracking for Surveillance", CSE 252 Project Report, Nov. 29, 2005. pp. 1-5.*
Comaniciu, D. et al., "Kernel-Based Object Tracking", IEEE Transactions on Pattern Analysis and Machine Intelligence, vol. 25, Issue 5, pp. 564-577. May 2003.
Arulampalam, M. S. et al., "A Tutorial on Particle Filters for Online Nonlinear/Non-Gaussian Bayesian Tracking", IEEE Transactions on Signal Processing, vol. 50, No. 2, Feb. 2002.
Javed, O. et al., "Tracking Across Multiple Cameras With Disjoint Views", Proceedings of the Ninth IEEE International Conference on Computer Vision (ICCV'03).

* cited by examiner

*Primary Examiner* — Tom Y Lu
(74) *Attorney, Agent, or Firm* — Anna L. Linne; Ronald A. D'Alessandro; Keohane & D'Alessandro PLLC

(57) ABSTRACT

An approach that detects objects crossing a virtual boundary line is provided. Specifically, an object detection tool provides this capability. The object detection tool comprises a boundary component configured to define a virtual boundary line in a video region of interest, and establish a set of ground patch regions surrounding the virtual boundary line. The object detection tool further comprises an extraction component configured to extract a set of attributes from each of the set of ground patch regions, and update a ground patch history model with the set of attributes from each of the set of ground patch regions. An analysis component is configured to analyze the ground patch history model to detect whether an object captured in at least one of the set of ground patch regions is crossing the virtual boundary line in the video region of interest.

20 Claims, 4 Drawing Sheets

DETECTING OBJECTS CROSSING A VIRTUAL BOUNDARY LINE

FIELD OF THE INVENTION

The present invention generally relates to video surveillance. Specifically, the present invention provides a way to improve detection of virtual boundary line crossings.

BACKGROUND OF THE INVENTION

Video surveillance is of critical concern in many areas of life. One problem with video as a surveillance tool is that it may be manually intensive to monitor. One approach to increase the detection of various events involves the use of virtual boundary lines, i.e., virtual tripwires, in a video region of interest. However, prior art tripwire approaches are based on the assumption that the surveillance system is able to perform accurate object detection and tracking tasks. Based on the detected object trajectory in the visual input, those systems are able to determine if the tripwire is crossed by detecting an intersection between object trajectory and the virtual boundary. However, this prior art solution is limited because many virtual boundary crossings are not detected correctly in cases of: crowded scenes, objects that are very close together, or objects connected by long shadows, etc.

SUMMARY OF THE INVENTION

In one embodiment, there is a method for detecting objects crossing a virtual boundary line. In this embodiment, the method comprises: defining a virtual boundary line in a video region of interest; establishing a set of ground patch regions surrounding the virtual boundary line; extracting a set of attributes from each of the set of ground patch regions; updating a ground patch history model with the set of attributes from each of the set of ground patch regions; and analyzing the ground patch history model to detect whether an object captured in at least one of the set of ground patch regions is crossing the virtual boundary line in the video region of interest.

In a second embodiment, there is a system for detecting objects crossing a virtual boundary line. In this embodiment, the system comprises at least one processing unit, and memory operably associated with the at least one processing unit. An object detection tool is storable in memory and executable by the at least one processing unit. The object detection tool comprises: a boundary component configured to define a virtual boundary line in a video region of interest, and establish a set of ground patch regions surrounding the virtual boundary line. The object detection tool further comprises an extraction component configured to extract a set of attributes from each of the set of ground patch regions, and update a ground patch history model with the set of attributes from each of the set of ground patch regions. An analysis component is configured to analyze the ground patch history model to detect whether an object captured in at least one of the set of ground patch regions is crossing the virtual boundary line in the video region of interest.

In a third embodiment, there is a computer-readable medium storing computer instructions, which when executed, enables a computer system to detect objects crossing a virtual boundary line, the computer instructions comprising: defining a virtual boundary line in a video region of interest; establishing a set of ground patch regions surrounding the virtual boundary line; extracting a set of attributes from each of the set of ground patch regions; updating a ground patch history model with the set of attributes from each of the set of ground patch regions; and analyzing the ground patch history model to detect whether an object captured in at least one of the set of ground patch regions is crossing the virtual boundary line in the video region of interest.

In a fourth embodiment, there is a method for deploying an object detection tool for use in a computer system that provides detection of objects crossing a virtual boundary line. In this embodiment, a computer infrastructure is provided and is operable to: define a virtual boundary line in a video region of interest; establish a set of ground patch regions surrounding the virtual boundary line; extract a set of attributes from each of the set of ground patch regions; update a ground patch history model with the set of attributes from each of the set of ground patch regions; and analyze the ground patch history model to detect whether an object captured in at least one of the set of ground patch regions is crossing the virtual boundary line in the video region of interest.

Figure 1:
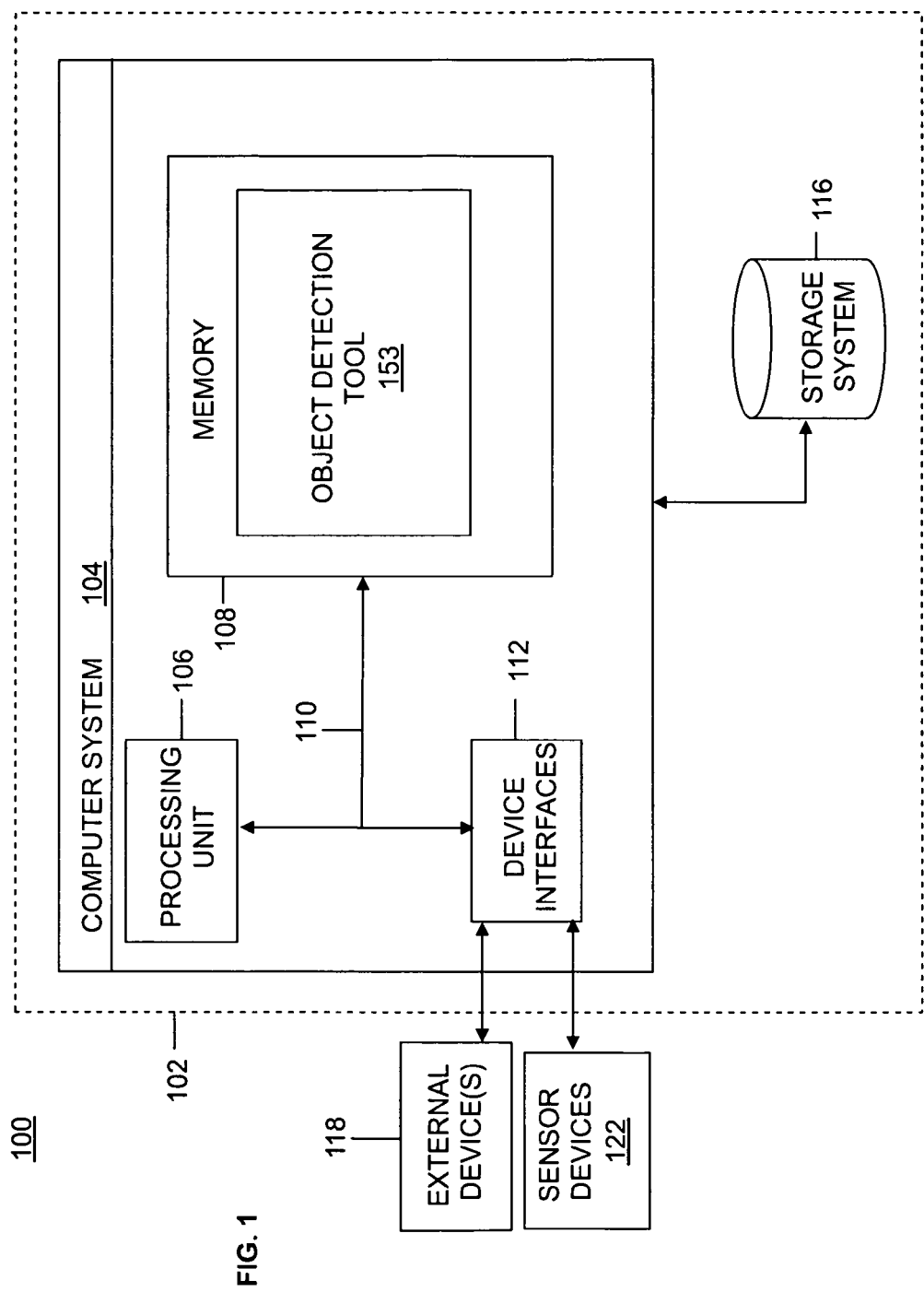
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to automatically detecting objects crossing virtual boundary lines in a video region of interest in various scenarios without utilizing explicit object detection and tracking techniques at the intersection of the virtual boundary line. In these embodiments, an object detection tool provides this capability. Specifically, the object detection tool comprises a boundary component configured to define a virtual boundary line in a video region of interest, and establish a set of ground patch regions surrounding the virtual boundary line. The object detection tool further comprises an extraction component configured to extract a set of attributes from each of the set of ground patch regions, and update a ground patch history model with the set of attributes from each of the set of ground patch regions. An analysis component is configured to analyze the ground patch history model to detect whether an object captured in at least one of the set of ground patch regions is crossing the virtual boundary line in the video region of interest.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for detecting objects crossing a virtual boundary line in a video region of interest. It should be understood that any other computers implemented under the present invention may have different components/software, but will perform similar functions. As shown, computer system 104 includes a processing unit 106 capable of analyzing sensor data, and producing a usable output, e.g., compressed video and video meta-data. Also shown is memory 108 for storing an object detection tool 153, a bus 110, and device interfaces 112.

Figure 2:
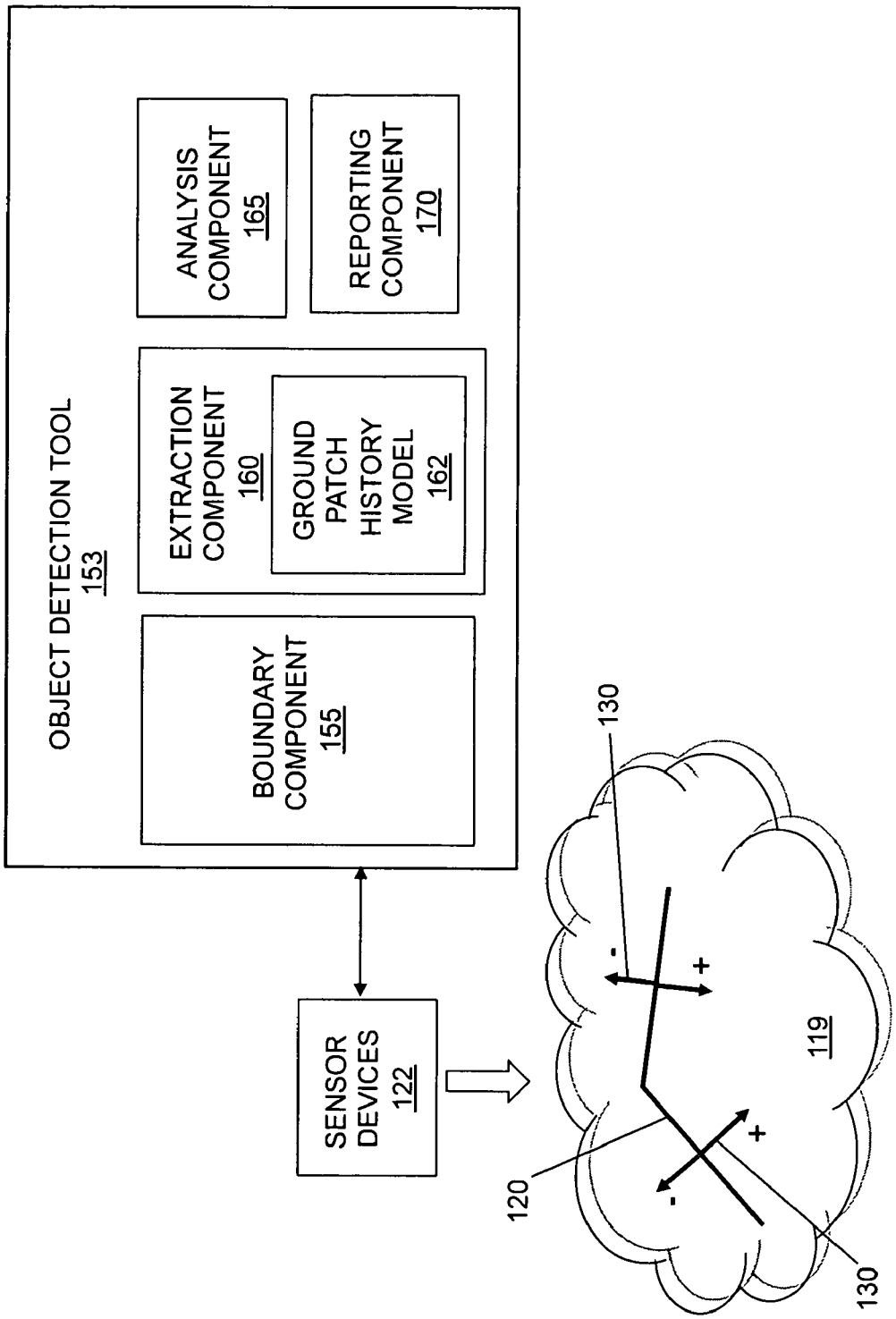
FIG. 2 shows an object detection tool that operates in the environment shown in FIG. 1.

Computer system 104 is shown communicating with a set (i.e., one or more) of sensor devices 122 that communicate with bus 110 via device interfaces 112. As shown in FIG. 2, sensor devices monitor and receive visual information from a video region of interest 119. Sensor devices 122 include one or more sensor devices for capturing image data representing visual attributes of moving objects (e.g., people, automobiles, etc.) within video region of interest 119. Sensor device 122 can include virtually any type of sensor capable of capturing visual attributes of objects, such as, but not limited to: optical sensors, infrared detectors, thermal cameras, still cameras, analog video cameras, digital video cameras, or any other similar device that can generate sensor data of sufficient quality to support the methods of the invention as described herein.

Processing unit 106 (FIG. 1) collects and routes signals representing outputs from sensor devices 122 to object detection tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption. Different sensor systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)). In some embodiments, sensor devices 122 are capable of two-way communication, and thus can receive signals (to power up, to sound an alert, etc.) from object detection tool 153.

In general, processing unit 106 executes computer program code, such as program code for operating object detection tool 153, which is stored in memory 108 and/or storage system 116. While executing computer program code, processing unit 106 can read and/or write data to/from memory 108 and storage system 116. Storage system 116 stores sensor data, including video metadata generated by processing unit 106, as well as rules against which the metadata is compared to identify objects and attributes of objects present within video region of interest 119. Storage system 116 can include VCRs, DVRs, RAID arrays, USB hard drives, optical disk recorders, flash storage devices, image analysis devices, general purpose computers, video enhancement devices, de-interlacers, scalers, and/or other video or data processing and storage elements for storing and/or processing video. The video signals can be captured and stored in various analog and/or digital formats, including, but not limited to, Nation Television System Committee (NTSC), Phase Alternating Line (PAL), and Sequential Color with Memory (SECAM), uncompressed digital signals using DVI or HDMI connections, and/or compressed digital signals based on a common codec format (e.g., MPEG, MPEG2, MPEG4, or H.264).

Although not shown, computer system 104 could also include I/O interfaces that communicate with one or more external devices 118 that enable a user to interact with computer system 104 (e.g., a keyboard, a pointing device, a display, etc.).

Figure 3:
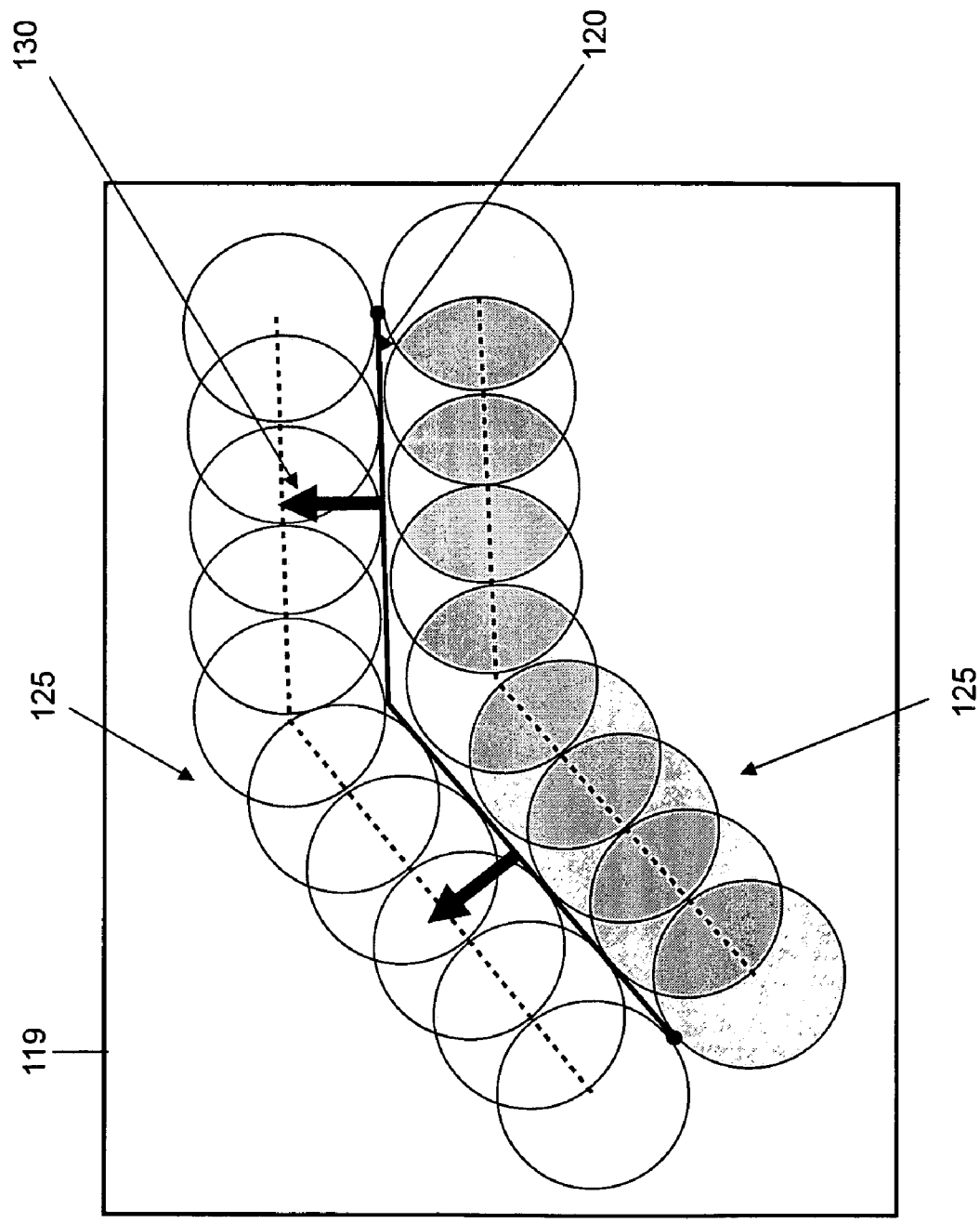
FIG. 3 shows a set of ground patch regions surrounding a virtual boundary line in a video region of interest according to embodiments of the invention.

FIGS. 2-3 show a more detailed view of object detection tool 153 according to embodiments of the invention. As shown, object detection tool 153 comprises a boundary component 155 configured to define a virtual boundary line 120 (i.e., a virtual tripwire) in video region of interest 119. Virtual boundary line 120 is generally of arbitrary shape, which may be user-defined, and is placed in the digital video using computer-based video processing techniques. Virtual boundary line 120 is monitored, statistics may be compiled, intrusions detected, events recorded, responses triggered, etc. Specifically, as shown in FIG. 3, boundary component 155 is configured to establish a set of ground patch regions 125 surrounding virtual boundary line 120. In one embodiment, boundary component 155 creates a series of overlapping ground patch regions along each side of virtual boundary line 120. It can be appreciated that each of the set of ground patch regions is capable of taking on any number of geometries (e.g., square, rectangle, etc.), and is not limited to the overlapping circles depicted in FIG. 3.

Boundary component 155 processes sensor data from sensor devices 122 in real-time, identifying attributes of objects and ground patch regions that are detected in video region of interest 119. In one embodiment, in which video sensor data is received from a digital video camera, boundary component 155 uploads messages in extensible mark-up language (XML) to a data repository, such as storage system 116 (FIG. 1). Boundary component 155 provides the software framework for hosting a wide range of video analytics to accomplish this. The video analytics are intended to detect a person and/or a plurality of objects within video region of interest 119. Objects can be detected using a number of approaches, including but not limited to: background modeling, object detection and tracking, spatial intensity field gradient analysis, diamond search block-based (DSBB) gradient descent motion estimation, or any other method for detecting and identifying objects captured by a sensor device. In an exemplary embodiment, boundary component 155 is configured to analyze each of set of ground patch regions 125 to identify foreground objects within each of set of ground patch regions 125. For each ground patch region containing foreground object(s), the motion area inside this patch is estimated. If the motion area (i.e., foreground area) is greater than a predetermined threshold (e.g., 75% of the ground patch region area), then the ground patch region is classified as foreground.

Next, the current appearance features of the identified foreground ground patch regions are computed. Specifically, object detection tool 153 comprises an extraction component 160 configured to extract a set of attributes from each of set of ground patch regions 125, and update a ground patch history model 162 with the set of attributes extracted from each of set ground patch regions 125. In an exemplary embodiment, extraction component 160 relates each of the attributes to ground patch history model 162 according to various attributes including, but not limited to, appearance, color, texture, gradients, edge detection, motion characteristics, shape, spatial location, etc. Extraction component 160 provides the algorithm(s) necessary to take the data associated with each of the extracted attributes and dynamically map it into groups/models for each ground patch region, along with additional metadata that captures a more detailed description of the extracted attribute and/or objects. For example, ground patch history model 162 comprises information about each ground patch region including, but not limited to: ground patch region center location, ground patch region radius, timestamp, frame number, a list of history patch models (e.g., color histograms, appearance features, etc.), a list of neighboring ground patch regions in spatial proximity and/or on an opposite side of the virtual boundary line, or a patch motion vector indicating the general direction of motion for each ground patch region.

Ground patch history model 162 is continuously updated and cross-referenced against attributes from previously received sensor data (i.e., video input) to determine if each ground patch region's appearance has changed. Object detection tool 153 comprises an analysis component 165 configured to analyze the updated ground patch history model 162 to detect whether an object captured in at least one of set of ground patch regions 125 is crossing virtual boundary line 120 in video region of interest 119. Specifically, analysis component 165 is configured to analyze appearance features within ground patch history model 162 for each of set of ground patch regions 125, and determine if a pair of similar ground patch regions is present among set of ground patch regions 125 based on the appearance features within ground patch history model for each of set of ground patch regions 125.

Next, analysis component 165 determines a location of each of the pair of similar ground patch regions. For example, appearance similarities are compared between a specific patch being analyzed and neighboring ground patch regions on the other side of virtual boundary line 120. Analysis component 165 compares a direction of motion for each of the pair of similar ground patch regions in the case that each of the pair of similar ground patch regions is located on a different side of virtual boundary line 120 in video region of interest 119. Once a pair of similar ground patch regions are matched by imposing an attribute similarity constraint, the direction of the object movements in the pair of similar ground patch regions are estimated using techniques such as optical flow estimation, affine transformation, smallest squared difference (SSD), etc. If the matched ground patch regions are due to the same object, their moving direction should be consistent (i.e., both patches have movement vectors pointing to the same side of the virtual boundary line). If the matched patch pair is caused by different objects with similar appearances, the matched pair's moving directions will typically be different. Thus, by imposing this motion direction agreement constraint, false positives caused by matching different objects are reduced.

To determine if the object is moving in the required direction, its motion direction should be compared with a virtual boundary line crossing direction 130 (e.g., inside (+) to outside (−), or vice versa). If there is a match between the virtual boundary line crossing direction 130 and the object motion direction, an object is detected as crossing virtual boundary line 120 in video region of interest 119, and an alert is generated by a reporting component 170. Reporting component 170 is configured to generate an alert in the case that the direction of motion for each of the pair of similar ground patch regions is substantially the same.

It can be appreciated that the methodologies disclosed herein can be used within a computer system to detect objects crossing a virtual boundary line, as shown in FIG. 1. In this case, object detection tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 4:
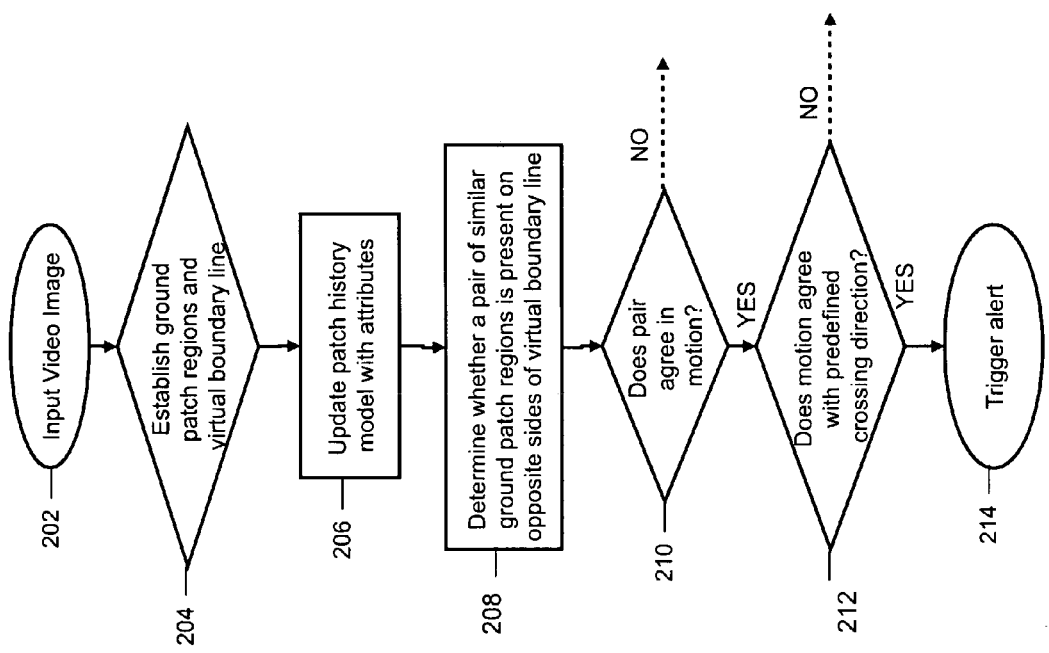
FIG. 4 shows a flow diagram of an approach for detecting objects crossing virtual boundary lines in a video region of interest according to embodiments of the invention.

The program modules carry out the methodologies disclosed herein, as shown in FIG. 4. According to one embodiment, at 202, sensor video input data corresponding to a region of interest is received. At 204, a set of ground patch regions is established around a virtual boundary line. At 206, attributes are extracted from each of the set of ground patch regions, and a ground patch history model is updated with the extracted set of attributes from each of the set of ground patch regions. At 208, it is determined whether a pair of similar ground patch regions is present on opposite sides of the virtual boundary line. At 210, it is determined whether each of the pair of similar ground patch regions agrees in direction of motion. If yes, at 212, it is determined whether the directions of motion for each of the pair of similar ground patch regions agrees with a predefined virtual boundary line crossing direction. If yes, an alert is triggered at 214.

The flowchart of FIG. 4 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Furthermore, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for detecting objects crossing a virtual boundary line. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for detecting objects crossing a virtual boundary line comprising:
    defining a virtual boundary line in a region of interest;
    establishing a set of ground patch regions surrounding the virtual boundary line;
    extracting a set of attributes from each of the set of ground patch regions;
    updating a ground patch history model with the set of attributes from each of the set of ground patch regions; and
    analyzing the ground patch history model to detect whether an object captured in at least one of the set of ground patch regions is crossing the virtual boundary line in the video region of interest.

2. The method according to claim 1 further comprising generating an alert in the case that the object is detected crossing the virtual boundary line in the video region of interest.

3. The method according to claim 2 further comprising analyzing each of the set of ground patch regions to identify foreground objects within each of the set of ground patch regions.

4. The method according to claim 3, the analyzing comprising:
    analyzing appearance features within the ground patch history model for each of the set of ground patch regions;
    determining if a pair of similar ground patch regions is present among the set of ground patch regions based on the appearance features within the ground patch history model for each of the set of ground patch regions;
    determining a location of each of the pair of similar ground patch regions; and
    comparing a direction of motion for each of the pair of similar ground patch regions in the case that each of the pair of similar ground patch regions is located on a different side of the virtual boundary line in the video region of interest.

5. The method according to claim 4, wherein the alert is generated in the case that the direction of motion for each of the pair of similar ground patch regions is substantially the same.

6. A system for detecting objects crossing a virtual boundary line, the system comprising:
    at least one processing unit;
    memory operably associated with the at least one processing unit; and
    an object detection tool storable in memory and executable by the at least one processing unit, the object detection tool comprising:
        a boundary component configured to:
            define a virtual boundary line in a video region of interest; and
            establish a set of ground patch regions surrounding the virtual boundary line;
        an extraction component configured to:
            extract a set of attributes from each of the set of ground patch regions; and
            update a ground patch history model with the set of attributes from each of the set of ground patch regions; and
        an analysis component configured to analyze the ground patch history model to detect whether an object captured in at least one of the set of ground patch regions is crossing the virtual boundary line in the video region of interest.

7. The object detection tool according to claim 6 further comprising a reporting component configured to generate an alert in the case that the object is detected crossing the virtual boundary line in the video region of interest.

8. The object detection tool according to claim 7, the boundary component further configured to analyze each of the set of ground patch regions to identify foreground objects within each of the set of ground patch regions.

9. The object detection tool according to claim 8, the analysis component further configured to:
    analyze appearance features within the ground patch history model for each of the set of ground patch regions;
    determine if a pair of similar ground patch regions is present among the set of ground patch regions based on the appearance features within the ground patch history model for each of the set of ground patch regions;
    determine a location of each of the pair of similar ground patch regions;
    compare a direction of motion for each of the pair of similar ground patch regions in the case that each of the pair of similar ground patch regions is located on a different side of the virtual boundary line in the video region of interest.

10. The object detection tool according to claim 9, wherein the reporting component is configured to generate the alert in the case that the direction of motion for each of the pair of similar ground patch regions is substantially the same.

11. A computer-readable storage device storing computer instructions, which when executed, enables a computer system to detect objects crossing a virtual boundary line, the computer instructions comprising:

defining a virtual boundary line in a video region of interest;

establish a set of ground patch regions surrounding the virtual boundary line;

extracting a set of attributes from each of the set of ground patch regions;

updating a ground patch history model with the set of attributes from each of the set of ground patch regions; and analyzing the ground patch history model to detect whether an object captured in at least one of the set of ground patch regions is crossing the virtual boundary line in the video region of interest.

12. The computer-readable storage device according to claim 11 further comprising computer instructions for generating an alert in the case that the object is detected crossing the virtual boundary line in the video region of interest.

13. The computer-readable storage device according to claim 12 further comprising computer instructions for analyzing each of the set of ground patch regions to identify foreground objects within each of the set of ground patch regions.

14. The computer-readable storage device according to claim 13, the computer instructions for analyzing the appearance model further comprising computer instructions for:

analyzing appearance features within the ground patch history model for each of the set of ground patch regions;

determining if a pair of similar ground patch regions is present among the set of ground patch regions based on the appearance features within the ground patch history model for each of the set of ground patch regions;

determining a location of each of the pair of similar ground patch regions;

comparing a direction of motion for each of the pair of similar ground patch regions in the case that each of the pair of similar ground patch regions is located on a different side of the virtual boundary line in the video region of interest.

15. The computer-readable storage device according to claim 14, wherein the alert is generated in the case that the direction of motion for each of the pair of similar ground patch regions is substantially the same.

16. A method for deploying an object detection tool for use in a computer system that detects objects crossing a virtual boundary line, the method comprising:

providing a computer infrastructure operable to:

define a virtual boundary line in a video region of interest;

establish a set of ground patch regions surrounding the virtual boundary line;

extract a set of attributes from each of the set of ground patch regions;

update a ground patch history model with the set of attributes from each of the set of ground patch regions; and analyze the ground patch history model to detect whether an object captured in at least one of the set of ground patch regions is crossing the virtual boundary line in the video region of interest.

17. The method according to claim 16, the computer infrastructure further operable to generate an alert in the case that the object is detected crossing the virtual boundary line in the video region of interest.

18. The method according to claim 17, the computer infrastructure further operable to analyze each of the set of ground patch regions to identify foreground objects within each of the set of ground patch regions.

19. The method according to claim 18, the computer infrastructure operable to analyze the appearance model further operable to:

analyze appearance features within the ground patch history model for each of the set of ground patch regions;

determine if a pair of similar ground patch regions is present among the set of ground patch regions based on the appearance features within the ground patch history model for each of the set of ground patch regions;

determine a location of each of the pair of similar ground patch regions; and compare a direction of motion for each of the pair of similar ground patch regions in the case that each of the pair of similar ground patch regions is located on a different side of the virtual boundary line in the video region of interest.

20. The method according to claim 19, the computer infrastructure further operable to generate the alert in the case that the direction of motion for each of the pair of similar ground patch regions is substantially the same.

\* \* \* \* \*